(12) United States Patent
Okuyama et al.

(10) Patent No.: US 11,472,728 B2
(45) Date of Patent: Oct. 18, 2022

(54) METHOD FOR MANUFACTURING GLASS PLATE AND MANUFACTURING APPARATUS THEREFOR

(71) Applicant: Nippon Electric Glass Co., Ltd., Shiga (JP)

(72) Inventors: Isao Okuyama, Shiga (JP); Mamoru Nakai, Shiga (JP); Hideki Tanabe, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 124 days.

(21) Appl. No.: 16/758,084

(22) PCT Filed: Oct. 17, 2018

(86) PCT No.: PCT/JP2018/038606
§ 371 (c)(1),
(2) Date: Apr. 22, 2020

(87) PCT Pub. No.: WO2019/097940
PCT Pub. Date: May 23, 2019

(65) Prior Publication Data
US 2021/0188690 A1  Jun. 24, 2021

(30) Foreign Application Priority Data
Nov. 15, 2017 (JP) .............................. JP2017-220006

(51) Int. Cl.
*C03B 33/02* (2006.01)
*C03B 17/06* (2006.01)
*C03B 35/16* (2006.01)

(52) U.S. Cl.
CPC ........ *C03B 33/0215* (2013.01); *C03B 17/064* (2013.01); *C03B 33/02* (2013.01); *C03B 35/16* (2013.01)

(58) Field of Classification Search
CPC .................................................. C03B 35/205
See application file for complete search history.

(56) References Cited

U.S. PATENT DOCUMENTS

| 3,189,424 A * | 6/1965 | Brichard | B65G 49/066 65/196 |
| 6,616,025 B1 * | 9/2003 | Andrewlavage, Jr. | C03B 21/02 225/103 |
| 2013/0134198 A1 * | 5/2013 | Hill | C03B 33/0215 254/133 R |

FOREIGN PATENT DOCUMENTS

| JP | 2005162604 A * | 6/2005 | ......... C03B 33/0215 |
| JP | 2014-005170 | 1/2014 | |

(Continued)

OTHER PUBLICATIONS

WO2017199681 machine translation, Tsukada et al., Method and Device for producing glass sheet, and device for conveying glass sheet, Nov. 2017 (Year: 2017).*

(Continued)

*Primary Examiner* — Queenie S Dehghan
(74) *Attorney, Agent, or Firm* — Wenderoth, Lind & Ponack, L.L.P.

(57) ABSTRACT

Provided is a method of manufacturing a glass sheet, which comprises a conveying step of conveying a glass sheet (G3) by holding an upper part of the glass sheet (G3) in a vertical posture. The conveying step comprises a first conveying step of conveying the glass sheet (G3) in a first direction along a direction perpendicular to a main surface of the glass sheet (G3), and a second conveying step of conveying the glass sheet (G3) in a second direction along a direction parallel to the main surface after the first conveying step. When a conveying direction of the glass sheet is changed from the first direction to the second direction, a lower part of the (Continued)

main surface (G3*y*) is supported by a roller (41) of a support portion (4) from a forward side in the conveying direction of the glass sheet (G3) conveyed in the first direction.

19 Claims, 5 Drawing Sheets

(56) References Cited

FOREIGN PATENT DOCUMENTS

| JP | 2014-024720 | | 2/2014 | |
| JP | 2014-122124 | | 7/2014 | |
| JP | 2016026968 A | * | 2/2016 | ........... B65G 49/061 |
| WO | 2017/199681 | | 11/2017 | |
| WO | WO-2020060829 A1 | * | 3/2020 | ........... B65G 49/063 |

OTHER PUBLICATIONS

JP 2016026968 machine translation, Ise et al., Method for manufacturing glass plate, Feb. 2016 (Year: 2016).*
International Search Report dated Dec. 11, 2018 in International (PCT) Application No. PCT/JP2018/038606.
International Preliminary Report on Patentability and Written Opinion of the International Searching Authority dated May 19, 2020 in International (PCT) Application No. PCT/JP2018/038606.

* cited by examiner

METHOD FOR MANUFACTURING GLASS PLATE AND MANUFACTURING APPARATUS THEREFOR

TECHNICAL FIELD

The present invention relates to an improvement in manufacturing technology of a glass sheet.

BACKGROUND ART

As a method of manufacturing a glass sheet, there are widely adopted methods using a down-draw method represented by an overflow down-draw method, a slot down-draw method, and a re-draw method, and a method using a float method. As an example of manufacturing steps for a glass sheet using those methods, the followings are given.

First, an elongated glass ribbon is continuously formed (for example, see Patent Literature 1). Next, the glass ribbon is cut at a predetermined length in a width direction to cut out a glass sheet from the glass ribbon (for example, see Patent Literature 2). After that, through various steps such as further cutting both end portions in the width direction of the glass sheet thus cut out (for example, see Patent Literature 3) and performing defect inspection, a glass sheet as a product is manufactured finally.

CITATION LIST

Patent Literature 1: JP 2014-122124 A
Patent Literature 2: JP 2014-005170 A
Patent Literature 3: JP 2014-024720 A

SUMMARY OF INVENTION

Technical Problem

Incidentally, when a glass sheet is to be manufactured using a down-draw method, a glass ribbon is continuously formed in a state of a vertical posture (for example, a perpendicular posture). Therefore, the glass sheet may be cut out from the glass ribbon in a vertical posture, and the glass sheet thus cut out may be conveyed while maintaining the vertical posture in a state in which an upper part (for example, an upper end portion) of the glass sheet is held and suspended. In this case, further, after the glass sheet in a vertical posture is conveyed along a direction perpendicular to a main surface, the glass sheet in a vertical posture may be conveyed along a direction parallel to the main surface.

Such conveyance in a vertical posture involving the direction change is carried out in a state in which the upper part of the glass sheet is held and suspended. Therefore, when the direction is changed, a lower part of the glass sheet, which is conveyed along the direction perpendicular to the main surface, easily swings like a pendulum due to an influence of air resistance, inertial force, or the like. As a result, for the reason of, for example, preventing breakage of the glass sheet during conveyance, waiting is required at a direction changing position until the posture of the glass sheet is stabilized. Therefore, after conveyance of the glass sheet along the direction perpendicular to the main surface, it takes time to restart conveyance of the glass sheet along the direction parallel to the main surface, and there is a problem in that it is difficult to increase speed of conveyance.

The above-mentioned problem is not limited to the case of using the down-draw method, but similarly occurs even when other forming methods such as the float method are used as long as the glass sheet is handled in a vertical posture.

The present invention has an object to increase speed of conveyance of a glass sheet in a vertical posture involving direction change.

Solution to Problem

According to one embodiment of the present invention, which has been devised in order to solve the above-mentioned problem, there is provided a method of manufacturing a glass sheet, which comprises a conveying step of conveying a glass sheet by holding an upper part of the glass sheet in a vertical posture, wherein the conveying step comprises a first conveying step of conveying the glass sheet in a first direction along a direction perpendicular to a main surface of the glass sheet, and a second conveying step of conveying the glass sheet in a second direction along a direction parallel to the main surface after the first conveying step, and wherein, when a conveying direction of the glass sheet is changed from the first direction to the second direction, a lower part of the main surface is supported by a support portion from a forward side in the conveying direction of the glass sheet to be conveyed in the first direction. Here, the "first direction along a direction perpendicular to a main surface of the glass sheet" and the "second direction along a direction parallel to the main surface" include not only a direction geometrically perpendicular or parallel to the main surface, but also include a direction substantially perpendicular or parallel to the main surface. With such a configuration, when the conveying direction of the glass sheet is changed from the first direction to the second direction, the lower part of the main surface is supported by the support portion from the forward side in the conveying direction of the glass sheet to be conveyed in the first direction. Thus, the lower part of the glass sheet is prevented from advancing toward the forward side in the conveying direction with respect to the upper part of the glass sheet due to an influence of air resistance, inertial force, or the like. As a result, swing of the lower part of the glass sheet is reliably suppressed, and the posture of the glass sheet is stabilized early. Thus, the glass sheet can be conveyed in the second direction immediately after the glass sheet is conveyed in the first direction so that it is possible to increase the conveyance speed of the glass sheet in a vertical posture.

In the above-mentioned configuration, it is preferred that a contact portion of the support portion to be brought into contact with the glass sheet comprise a roller that is rotatable so as to feed the glass sheet in the second direction. With this, even when the glass sheet is moved in the second direction in a state in which the support portion is held in contact with the glass sheet, the glass sheet is fed in the second direction through rotation of the roller. Therefore, breakage such as damage hardly occurs in the glass sheet. Thus, the configuration is particularly effective when the glass sheet is thin.

In the above-mentioned configuration, it is preferred that the support portion comprise a shock absorbing mechanism. With this, contact shock generated when the support portion comes into contact with the glass sheet is absorbed. Thus, breakage of the glass sheet is suppressed, and swing of the glass sheet can be suppressed at an earlier stage. Further, contact shock can be absorbed to suppress breakage of the glass sheet. Therefore, the conveyance speed of the glass sheet in the first direction can be increased. Accordingly, it is possible to contribute to further increase in speed of conveyance while preventing breakage of the glass sheet.

In the above-mentioned configuration, it is preferred that the second conveying step comprise a step of moving the glass sheet among a plurality of chambers continuous with each other through openings each having an elongated slit shape while conveying the glass sheet in the second direction, and that guide members, which each have a guide gap having an interval that becomes smaller toward downstream of the conveying direction, be arranged on near sides of the openings, respectively, and a lower part of the glass sheet is caused to pass through the guide gaps to be guided to the openings. With this, the plurality of chambers are continuous with each other through the openings each having a slit shape. Therefore, even when dust such as glass powder is generated in one chamber, the dust hardly enters the adjacent chamber. Further, the upper part of the glass sheet is held, and hence the position of the lower part of the glass sheet is liable to fluctuate. However, the lower part of the glass sheet can be smoothly guided by only causing the lower part of the glass sheet to pass through the guide gaps of the guide members arranged on the near sides of the openings. Thus, contact between the glass sheet and peripheral edge portions of the openings caused when the glass sheet passes through the openings can be reduced. Further, even when the glass sheet and the peripheral edge portions of the openings come into contact with each other, shock can be reduced.

In the above-mentioned configuration, a thickness of a center portion of the glass sheet in a width direction of the glass sheet may be 0.4 mm or less. That is, in a case of a thin glass sheet, when the conveying direction of the glass sheet is changed, swing of the lower part of the glass sheet tends to be large, and in addition, a risk of breakage is also increased. Accordingly, the effect of the invention of the present application that swing of the lower part of the glass sheet caused when the conveying direction is changed can be suppressed is further increased. Further, when the glass sheet is thin, warpage of the glass sheet tends to be large. Thus, in the invention of the present application, the effect is increased when, as in the configuration described above, the guide members are provided on the near sides of the openings in the step of moving the glass sheet among the plurality of chambers continuous with each other through the openings each having an elongated slit shape.

In the above-mentioned configuration, the method of manufacturing a glass sheet may further comprise: a forming step of continuously forming a glass ribbon in a vertical posture; a first cutting step of cutting the glass ribbon of the vertical posture in a width direction of the glass ribbon to obtain the glass sheet in a vertical posture; and a second cutting step of cutting the glass sheet of the vertical posture in an up-and-down direction of the glass sheet, wherein the first conveying step is carried out after the first cutting step and before the second cutting step, and wherein the second cutting step is carried out on a conveying path in the second conveying step. With this, the glass ribbon or the glass sheet can be cut while maintaining the vertical posture. Thus, space saving in the manufacturing steps comprising the cutting steps can be achieved.

According to one embodiment of the present invention which has been made in order to solve the above-mentioned problem, there is provided a manufacturing apparatus for a glass sheet, comprising a conveying apparatus configured to convey a glass sheet by holding an upper part of the glass sheet in a vertical posture, wherein the conveying apparatus comprises: a main body configured to convey the glass sheet in a first direction along a direction perpendicular to a main surface of the glass sheet and convey the glass sheet in a second direction along a direction parallel to the main surface, and a support portion configured to support a lower part of the main surface from a forward side in a conveying direction of the glass sheet to be conveyed in the first direction at a direction changing position at which the conveying direction is changed from the first direction to the second direction. With such a configuration, the same effects as those of the corresponding configurations described above can be attained.

Advantageous Effects of Invention

As described above, according to the present invention, it is possible to increase the conveyance speed of the glass sheet in a vertical posture.

DESCRIPTION OF EMBODIMENTS

Figure 1:
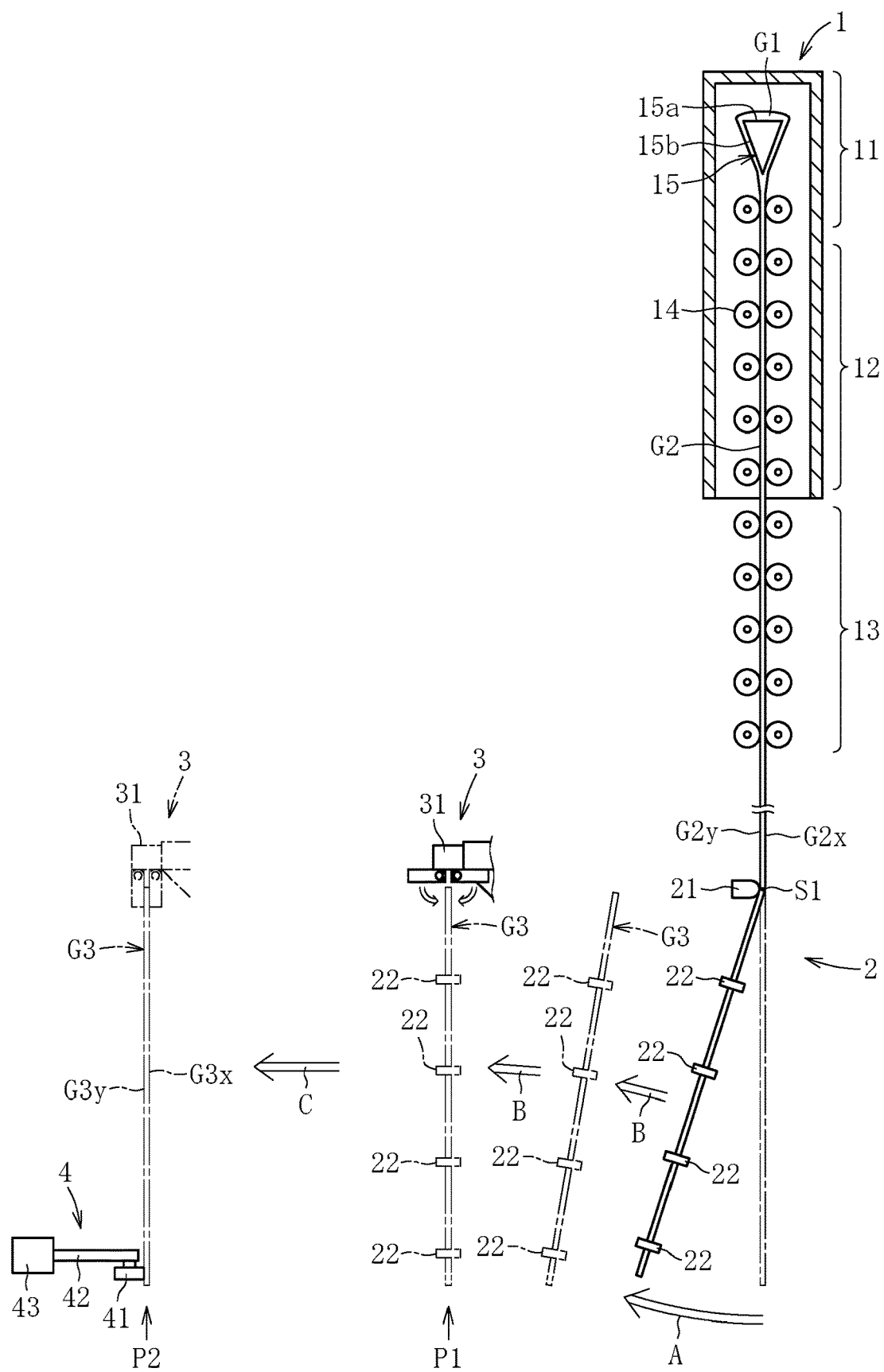
FIG. 1 is a schematic vertical sectional view of a manufacturing apparatus for a glass sheet.

Now, one embodiment according to the present invention is described with reference to the attached drawings.

As illustrated in FIG. 1 to FIG. 4, a manufacturing apparatus for a glass sheet comprises a forming apparatus 1, a first cutting apparatus 2, a first conveying apparatus 3, a support portion (i.e., stopper) 4, a second conveying apparatus 5, and a second cutting apparatus 6.

As illustrated in FIG. 1, the forming apparatus 1 is an apparatus configured to continuously form a glass ribbon G2, and comprises a forming furnace 11, an annealing furnace 12, a cooling zone 13, and roller pairs 14. The forming furnace 11 is configured to form the glass ribbon G2. The annealing furnace 12 is configured to anneal the glass ribbon G2 (annealing treatment). The cooling zone 13 is provided so as to cool the glass ribbon G2 to near room temperature. The roller pairs 14 are respectively provided for the forming furnace 11, the annealing furnace 12, and the cooling zone 13 in a plurality of states in an up-and-down direction.

In an internal space of the forming furnace 11, there is arranged a forming trough 15 configured to form the glass ribbon G2 from a molten glass G1 by an overflow down-draw method. The molten glass G1 supplied to the forming trough 15 is overflowed form a groove portion formed in a top portion 15a of the forming trough 15. The overflowed molten glass G1 flows along both side surfaces 15b having a wedge-shaped cross-section of the forming trough 15 to be joined together at a lower end of the forming trough 15, to thereby continuously form the glass ribbon G2 having a sheet shape. The formed glass ribbon G2 is in a vertical posture (preferably a perpendicular posture).

An internal space of the annealing furnace 12 has a predetermined temperature gradient toward the lower side. The glass ribbon G2 in a vertical posture is annealed so that its temperature is lowered as moving downward through the internal space of the annealing furnace 12. Through the annealing, internal strain of the glass ribbon G2 is reduced. The temperature gradient of the internal space of the annealing furnace 12 can be adjusted by, for example, a temperature adjustment apparatus such as a heating apparatus provided to an inner surface of the annealing furnace 12.

The plurality of roller pairs 14 is configured to sandwich both side edge portions of the glass ribbon G2 in a vertical posture from both front and rear sides. In the internal space of the annealing furnace 12 or the like, the plurality of roller pairs 14 may comprise roller pairs that do not sandwich the side edge portions of the glass ribbon G2. In other words, an opposing interval of the roller pairs 14 may be set larger than a thickness of the side edge portions of the glass ribbon G2 so that the glass ribbon G2 passes between the roller pairs 14. In this embodiment, rollers constituting the roller pairs 14 that are opposed to each other across the glass ribbon G2 are each formed of a double-supported roller having a rotation shaft extending to the outside of the furnace.

In this embodiment, the side edge portions of the glass ribbon G2, which are manufactured by the forming apparatus 1, on both sides in a width direction comprise portions having a larger thickness than a center portion in the width direction (hereinafter also referred to as "selvage portions") due to an influence of shrinkage in the course of forming or the like.

As illustrated in FIG. 1, the first cutting apparatus 2 is configured to cut the glass ribbon G2 in a vertical posture at a predetermined length in the width direction below the forming apparatus 1 so that glass sheets G3 are sequentially cut out form the glass ribbon G2. The glass sheet G3 is a glass original sheet (mother glass sheet) from which one or a plurality of product glass sheets are collected. Here, the width direction is a direction orthogonal to a longitudinal direction (extending direction) of the glass ribbon G2 and substantially matches with a horizontal direction in this embodiment.

The first cutting apparatus 2 comprises a wheel cutter (not shown), a contact portion 21, and holding portions 22. The wheel cutter is configured to form a scribe line S1 while traveling on a front surface G2x of the glass ribbon G2 in a vertical posture, which moves downward from the forming apparatus 1, along the width direction of the glass ribbon G2. The contact portion 21 is configured to support a region in which the scribe line S1 is formed from a rear surface G2y side. The holding portions 22 are each configured to perform an operation for applying bending stress to the scribe line S1 and the vicinity thereof (operation in the A direction) while holding a portion of the glass ribbon G2 corresponding to the glass sheet G3 to be cut. Here, the front surface G2x and the rear surface G2y refer to main surfaces opposed to each other in the thickness direction, and either of the main surfaces of the glass ribbon G2 may be the front surface G2x (or the rear surface G2y). This similarly applies to front and rear surfaces of the glass sheet G3 described later.

The wheel cutter is configured to form the scribe line S1 on the entire region or a part of the glass ribbon G2 in the width direction while being lowered so as to follow the glass ribbon G2 flowing downward. In this embodiment, the scribe line S1 is formed also on side edge portions comprising selvage portions having a relatively large thickness. The scribe line S1 may be formed by laser irradiation or the like.

The contact portion 21 is formed of a plate-like body (surface plate) having a flat surface to be held in contact with the entire region or a part of the glass ribbon G2 in the width direction while being lowered so as to follow the glass ribbon G2 flowing downward. A contact surface of the contact portion 21 may be a curved surface that is curved in the width direction.

The holding portions 22 are each formed of a chuck mechanism configured to sandwich the side edge portions of the glass ribbon G2 on both sides in the width direction from both the front and rear surfaces. It is preferred that the holding portions 22 be not held in contact with an effective surface described later of the glass sheet G3. In this embodiment, a plurality of holding portions 22 are provided for the side edge portions of the glass ribbon G2 on both sides in the width direction at intervals in the longitudinal direction of the glass ribbon G2. The plurality of holding portions 22 provided for the side edge portion on one side are all held by the same arm (not shown). Similarly, the plurality of holding portions 22 provided for the side edge portion on another side are all held by the same arm (not shown). Through an operation of the respective arms, the plurality of holding portions 22 perform an operation for curving the glass ribbon G2 (operation in the A direction) with the contact portion 21 being a fulcrum while being lowered so as to follow the glass ribbon G2 flowing downward. With this, bending stress is applied to the scribe line S1 and the vicinity thereof to cleave the glass ribbon G2 in the width direction along the scribe line S1. As a result of the cleaving, the glass sheet G3 is cut out from the glass ribbon G2. The holding portions 22 are not limited to the holding form of sandwiching the glass ribbon G2, and may hold any one of the front and rear surfaces of the glass ribbon G2 (or the glass sheet G3) by negative-pressure suction.

The holding portions 22 are configured to convey the glass sheet G3 thus cut out to a first position P1 along the B direction along with movement of the arms, and then deliver the glass sheet G3 to the first conveying apparatus 3. After the delivery, the holding portions 22 cancel the holding of the side edge portions of the glass sheet G3, and return to a position before starting the cutting out along with movement of the arms in order to cut out a next glass sheet G3 from the glass ribbon G2.

As illustrated in FIG. 1, the first conveying apparatus 3 comprises holding portions 31 configured to hold an upper part (upper end portion in this embodiment) of the glass sheet G3 in a suspended state.

The holding portions 31 are each formed of a chuck mechanism configured to sandwich the upper end portion of the glass sheet G3 from both the front and rear surfaces. It is preferred that the holding portions 31 be not held in contact with the effective surface (portion guaranteed in quality) formed in a center region of the glass sheet G3 excluding a frame-shaped peripheral edge portion thereof. It is preferred that the holding portions 31 sandwich the glass sheet G3, for example, in a range of 30 mm or less from the upper end of the glass sheet G3.

The holding portions 31 are configured to receive the glass sheet G3 in a vertical posture from the holding portions 22 of the first cutting apparatus 2 at the first position P1, and then convey the glass sheet G3 in a vertical posture to a second position P2 in the C direction (first direction) along a front-and-rear direction perpendicular to the front and rear surfaces of the glass sheet G3. It is only required that the C direction be substantially perpendicular to the front and rear surfaces of the glass sheet G3 and be a direction in which swing occurs in a lower part of the glass sheet G3 along with the conveyance. The C direction comprises, for example, a direction having an angular difference of ±15° or less with respect to a direction perpendicular to the front and rear surfaces. The holding portions 31 are not limited to the holding form of sandwiching the glass sheet G3, and may hold any one of the front and rear surfaces of the glass sheet G3 by negative-pressure suction.

Here, in a state in which the glass sheet G3 is suspended and held by the holding portions 31, the glass sheet G3 may be curved like a wave due to warpage caused by strain or the like of the glass sheet G3. The warpage is greatly affected by the side edge portions (selvage portions) of the glass sheet G3 in the width direction, which have a larger thickness than the center portion of the glass sheet G3 in the width direction, and tends to be reduced after the selvage portions are removed. Further, when the thickness of the glass sheet G3 is small, warpage tends to increase. In a state in which there is such warpage, for example, when the glass sheet G3 is sandwiched by two geometrically correct ideal planes having a flat shape, an opposing interval of the ideal planes is larger than the thickness of the glass sheet G3, and, for example, is 200 mm at the maximum when the thickness of a center portion G3a is 0.4 mm less.

Figure 2:
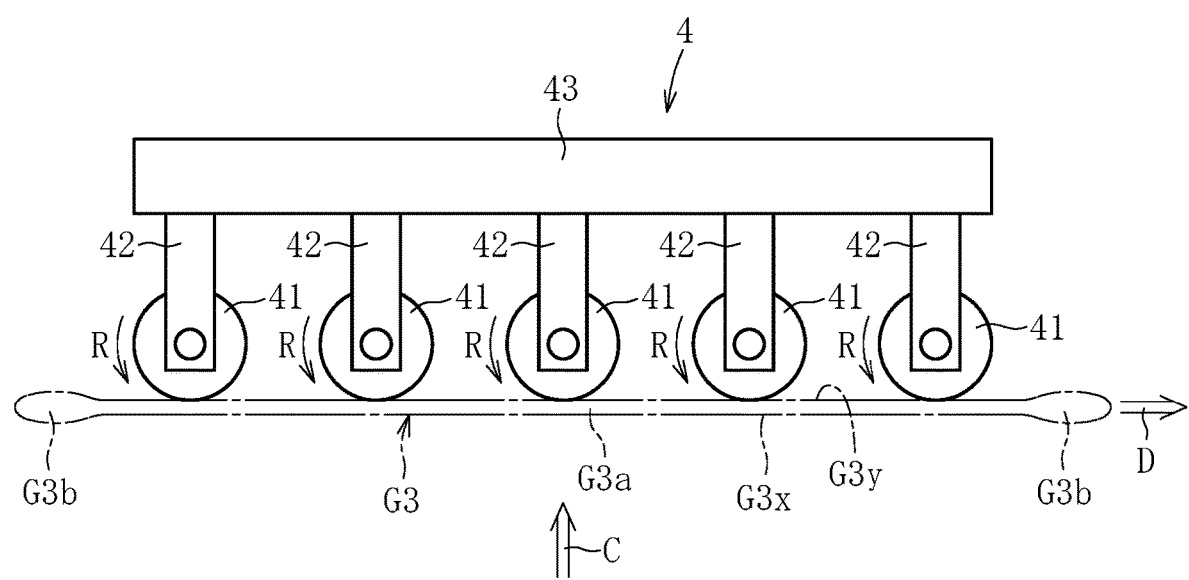
FIG. 2 is a plan view of a support portion arranged at a second position (direction changing position).

As illustrated in FIG. 1 and FIG. 2, the support portion 4 is fixed at the second position (direction changing position) P2 at which the conveying direction of the glass sheet G3 is changed from the C direction to a D direction (second direction) along the width direction parallel to the front and rear surfaces of the glass sheet G3. The support portion (i.e., stopper) 4 is configured to support a lower part (lower end portion in this embodiment) of a rear surface G3y of the glass sheet G3 from a forward side in the conveying direction of the glass sheet G3, which is conveyed by the first conveying apparatus 3, at the second position P2. With this, the lower part of the glass sheet G3 conveyed in the C direction is prevented from advancing toward the forward side in the conveying direction with respect to the upper part of the glass sheet G3 due to an influence of air resistance, inertial force, or the like. Therefore, swing of the lower part of the glass sheet G3 is reliably suppressed, and the posture of the glass sheet G3 is stabilized early. The support portion 4 is not limited to the case of being fixed at the second position P2. For example, the support portion 4 may be configured to come into contact with the glass sheet G3 on an upstream side of the second position P2, and then retreat to the second position P2 together with the glass sheet G3 while maintaining the contact state.

It is preferred that the support portion 4 be not brought into contact with the effective surface of the glass sheet G3. It is preferred that the support portion 4 be not brought into contact with the glass sheet G3, for example, in a range of 30 mm or less from the lower end of the glass sheet G3.

As illustrated in FIG. 2, in this embodiment, the support portion 4 comprises a plurality of rollers 41, arm portions 42, and a base portion 43. The plurality of rollers 41 are arranged in line at intervals in the D direction. The rollers 41 are mounted to the arm portions 42, respectively. The arm portions 42 are mounted to the base portion 43.

The rollers 41 are each formed of a free roller having a rotation shaft extending in the up-and-down direction. The rollers 41 are portions of the support portion 4 which are held in contact with the glass sheet G3. The rollers 41 rotate in association with movement of the glass sheet G3 in the D direction (R direction) to feed the glass sheet G3 in the D direction. As a matter of course, the rollers 41 may be driven to rotate so as to feed the glass sheet G3 in the D direction. The rollers 41 are not particularly limited as long as the rollers 41 are rotatable so as to feed the glass sheet G3 in the D direction, and may be, for example, spherical rollers that are rotatable in all directions.

In order to prevent swing or breakage of the glass sheet G3, as the material of the rollers 41, resin such as engineering plastic is preferably used, and, for example, resin having elasticity such as polyacetal is more preferably used.

It is preferred that the support portion 4 comprise a shock absorbing mechanism (not shown) at the arm portions 42, the base portion 43, or the like in order to absorb shock generated when the rollers 41 come into contact with the glass sheet G3. As the shock absorbing mechanism, there can be used a damper, a spring, a rubber, or the like. As the damper, there are given, for example, an oil damper, a friction damper, and a viscoelastic damper.

Figure 3:
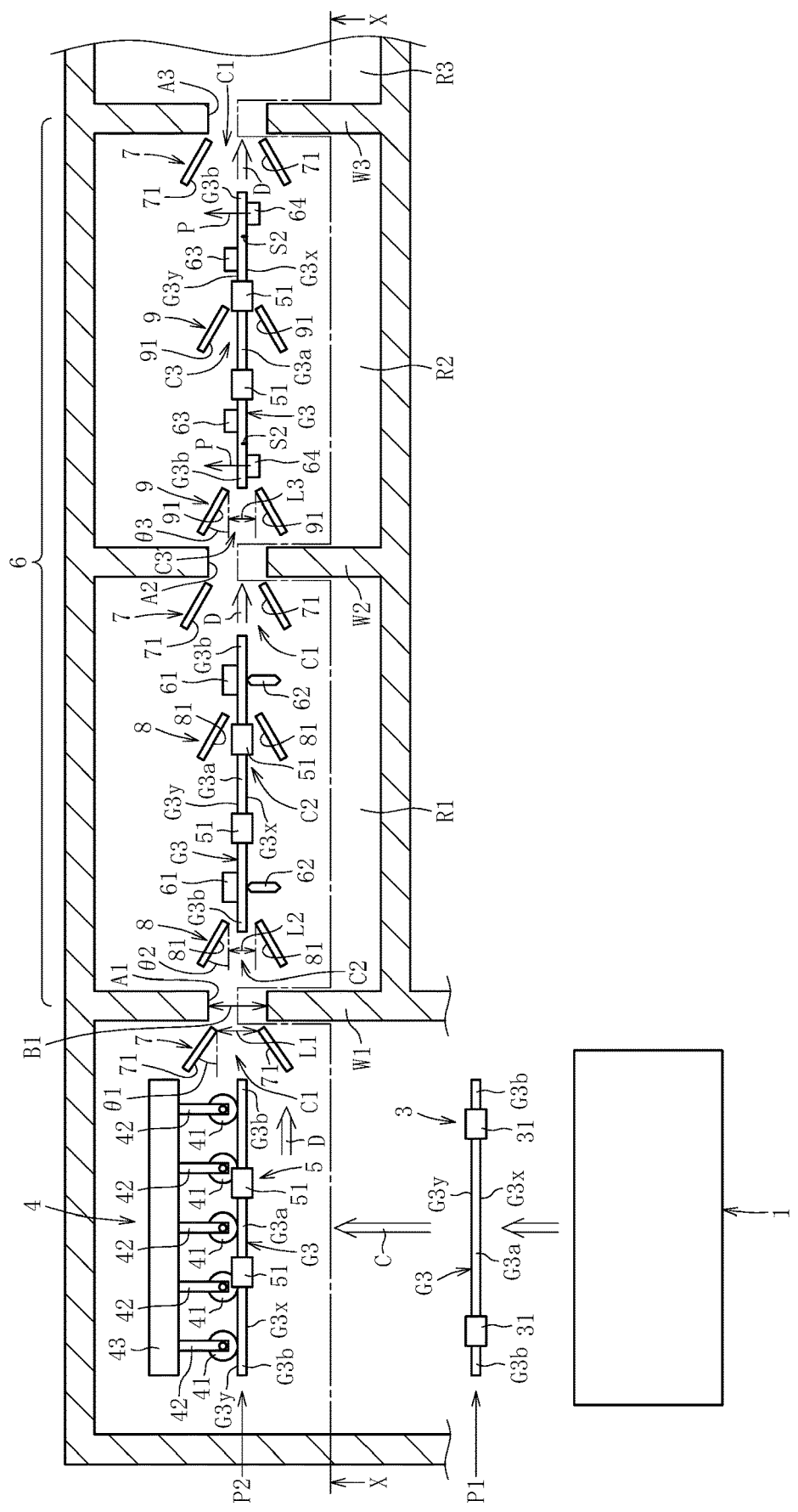
FIG. 3 is a schematic transverse sectional view of the manufacturing apparatus for a glass sheet.
Figure 4:
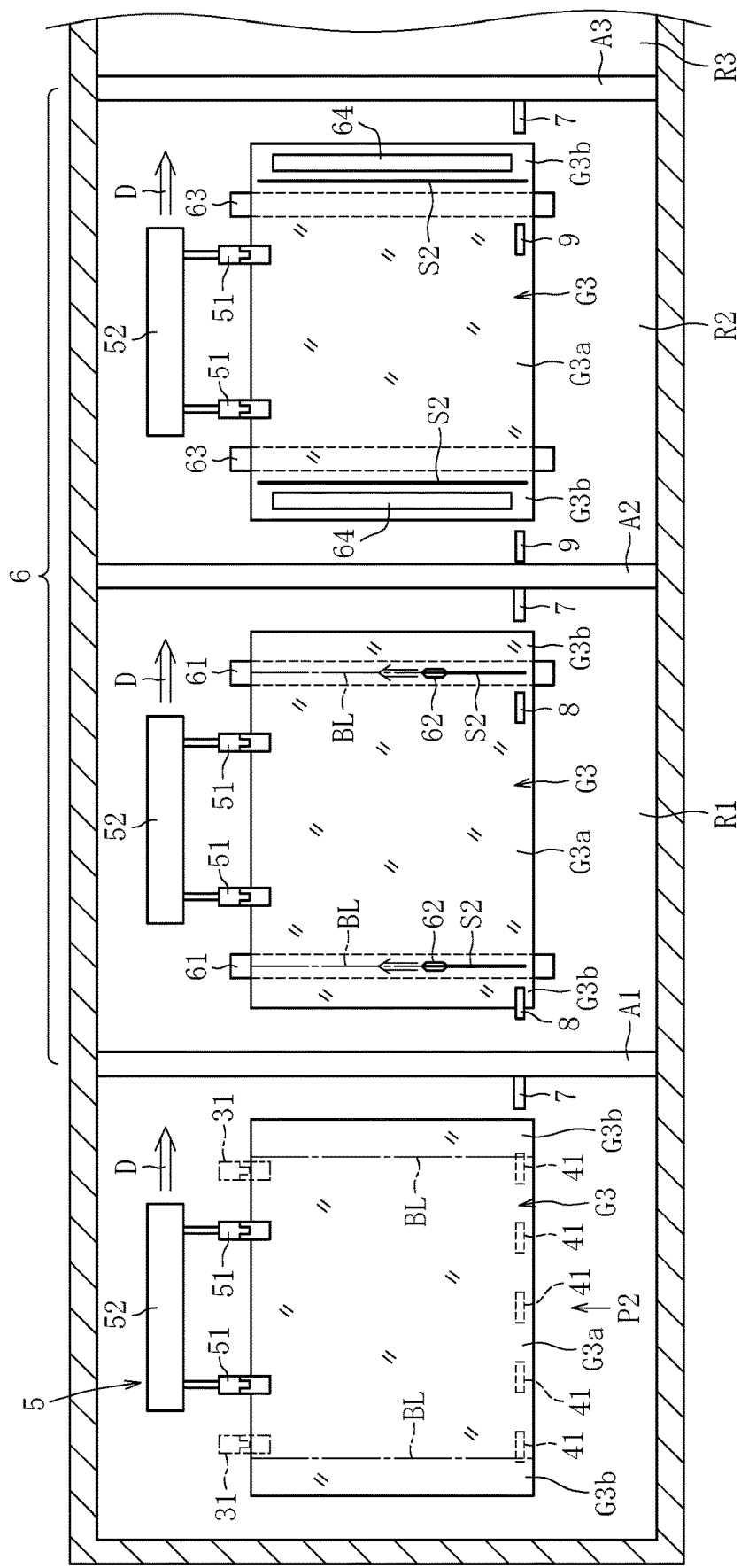
FIG. 4 is a sectional view taken along the line X-X of FIG. 3.

As illustrated in FIG. 3 and FIG. 4, the second conveying apparatus 5 comprises holding portions 51 configured to hold the upper end portion of the glass sheet G3 in a suspended state. In this embodiment, the holding portions 51 are configured to hold the center portion G3a in the width direction of the upper end portion of the glass sheet G3. Here, in the second position P2, the glass sheet G3 is arranged so that boundary lines BL between the center portion G3a and side edge portions G3b extend along the up-and-down direction. That is, the up-and-down direction of the glass sheet G3 and the up-and-down direction of the glass ribbon G2 (extending direction) match with each other. The center portion G3a is a product portion, and the side edge portions G3b are non-product portions (unnecessary portions). In this embodiment, the side edge portions G3b comprise the selvage portions having a larger thickness than the center portion G3a (see FIG. 2). The thickness of the center portion G3a is, for example, 1 mm or less, preferably, 0.4 mm or less. Further, it is preferred that the thickness of the center portion G3a be 0.05 mm or more.

The holding portions 51 are each formed of a chuck mechanism configured to sandwich the upper end portion of the glass sheet G3 from both the front and rear surfaces. It is preferred that the holding portions 51 be not held in contact with the effective surface of the glass sheet G3. It is preferred that the holding portions 51 sandwich the glass sheet G3, for example, in a range of 30 mm or less from the upper end of the glass sheet G3.

The holding portions 51 are configured to receive the glass sheet G3 in a vertical posture from the holding portions 31 of the first conveying apparatus 3 at the second position P2, and then convey the glass sheet G3 in a vertical posture in the direction indicated by the arrow D. It is only required that the D direction, that is, the second direction be a direction substantially parallel to the front and rear surfaces of the glass sheet G3, and the D direction comprises, for example, a direction having an angular difference of ±5° or less with respect to the front and rear surfaces.

Here, in the upper end portion of the glass sheet G, positions held by the holding portions 31 of the first conveying apparatus 3 and positions held by the holding portions 51 of the second conveying apparatus 5 are different from each other. That is, at the second position P2, first, the upper end portion of the glass sheet G3 is held by the holding portions 31 of the first conveying apparatus 3, and in this state, different positions of the upper end portion of the glass sheet G3 are held by the holding portions 51 of the second conveying apparatus 5. After that, in the state in which the glass sheet G3 is held by the holding portions 51 of the second conveying apparatus 5, the holding of the glass sheet G3 by the holding portions 31 of the first conveying apparatus 3 is canceled. With this, at the second position P2, the glass sheet G3 is delivered from the first conveying apparatus 3 to the second conveying apparatus 5. During the operation of changing the conveying direction involving the delivery, the rollers 41 of the support portion 4 are held in contact with the lower end portion of the rear surface G3*y* of the glass sheet G3. After the first conveying apparatus 3 delivers the glass sheet G3 to the second conveying apparatus 5, the first conveying apparatus 3 returns from the second position P2 to the first position P1.

The second conveying apparatus 5 comprises a moving body 52 configured to move in the D direction along a rail or the like, and the plurality of (two in the illustrated example) holding portions 51, which are arranged at an interval in the width direction of the glass sheet G3, are mounted to the moving body 52. In this embodiment, the plurality of holding portions 51 are mounted to one moving body 52, and the plurality of holding portions 51 are configured to move integrally along with movement of the moving body 52. The holding portions 51 may hold any one of the front and rear surfaces of the glass sheet G3 by negative-pressure suction. Further, the plurality of holding portions 51 may be mounted to independent moving bodies so as to be capable of being separated away from each other. With this, there are advantages that, for example, even when the size of the glass sheet G3 is changed, adjustment of the holding positions becomes easier, and a tensile force can be applied to the glass sheet G3 in the width direction.

In this embodiment, the second conveying apparatus 5 is configured to move the glass sheet G3 among a plurality of chambers R1, R2, and R3 continuous with each other through openings A1, A2, and A3 each having an elongated slit shape while conveying the glass sheet G3 from the second position P2 in the D direction. In this embodiment, the first chamber R1 and the second chamber R2 define a space for the second cutting apparatus 6 by partitioning, and the third chamber R3 defines a space for defect inspection for the glass sheet G3 by partitioning. A shutter for opening and closing the opening may be provided to each of the openings A1, A2, and A3.

As illustrated in FIG. 3 and FIG. 4, the second cutting apparatus 6 comprises the first chamber R1 and the second chamber R2. The first chamber R1 is provided to form scribe lines S2 along the boundary lines BL between the center portion G3*a* and the side edge portions G3*b* of the glass sheet G3. The second chamber R2 is provided downstream of the first chamber R1 to cleave the glass sheet G3 along the scribe lines S2. The glass sheet G3 conveyed by the second conveying apparatus 5 in the D direction is temporarily stopped in the first chamber R1 and the second chamber R2 for processing for cutting.

The second cutting apparatus 6 comprises contact portions 61 and wheel cutters 62 in the first chamber R1. The contact portions 61 are each configured to support a region in which the scribe line S2 for the glass sheet G3 is formed from the rear surface G3*y* side. The wheel cutters 62 are each configured to form the scribe line S2 on a front surface G3*x* side of the glass sheet G3. The wheel cutters 62 are each configured to form the scribe line S2 on the entire region or a part of the glass sheet G3 in the up-and-down direction. In this embodiment, the scribe line S2 is formed on a part of the glass sheet G3 in the up-and-down direction excluding the upper end portion and the lower end portion of the glass sheet G3. The scribe line S2 may be formed by other methods such as laser irradiation.

The second cutting apparatus 6 comprises contact portions 63 and pressing portions 64 in the second chamber R2. The contact portions 63 are each configured to support the rear surface G3*y* side of the center portion G3*a* in parallel to the scribe line S2 at a distance from the scribe line S2. The pressing portions 64 are each configured to be held in contact with the front surface G3*x* side of the side edge portion G3*b* in parallel to the scribe line S2 at a distance from the scribe line S2.

In this embodiment, the contact portions 63 and the pressing portions 64 are each a plate-like body (surface plate) having a flat surface to be held in contact with the glass sheet G3. The contact portions 63 and the pressing portions 64 may each be, for example, a rod-like body having a contact surface formed of a curved surface.

The pressing portions 64 push the side edge portions G3*b* toward the rear surface G3*y* side (P direction in FIG. 3) to curve the glass sheet G3 with the contact portions 63 being fulcrums. With this, bending stress is applied to the scribe lines S2 and the vicinities thereof to cleave the glass sheet G3 in the up-and-down direction along the scribe lines S2. As a result of the cleaving, the side edge portions G3*b* being non-product portions are removed from the glass sheet G3, and the center portion G3*a* being a product portion is cut out.

In this embodiment, the center portion G3*a* is held by the holding portions 51 before and after the cleaving, and the cleaved center portion G3*a* is conveyed to a subsequent step (in this embodiment, a defect inspection step carried out in the third chamber R3) under a state in which the center portion G3*a* is held by the holding portions 51. After the holding portions 51 move to the predetermined subsequent step (for example, the defect inspection step or the like), the holding portions 51 return to the second position P2 at which the holding portions 51 receive the glass sheet G3 from the first conveying apparatus 3.

Meanwhile, the side edge portions G3*b* are not held after the cleaving, and are dropped and collected at that place. In order to prevent drop of the side edge portions G3*b* in the vicinity of the center portion G3*a*, the side edge portions G3*b* may be held before and after the cleaving, and the side edge portions G3*b* may be collected at positions away from the center portion G3*a*. For the holding of the side edge portions G3*b*, there can be used, for example, one having a vacuum cup, which is capable of sucking the side edge portions G3*b*, at a tip of a robot arm.

As illustrated in FIG. 3 and FIG. 4, guide members 7, 8, and 9, which are configured to guide the lower end portion of the glass sheet G3, are provided at predetermined positions on a conveying path of the second conveying apparatus 5. The first guide members 7 are provided immediately upstream (on near sides) of the openings A1, A2, and A3 of the chambers R1, R2, and R3, respectively. The second guide members 8 are provided immediately upstream of formation positions of the scribe lines S2 in the first chamber R1, respectively. The third guide members 9 are provided immediately upstream of cleaving positions in the second chamber R2, respectively. The height positions of the guide members 7, 8, and 9 can be adjusted as appropriate, and the guide members 7, 8, and 9 are removable.

As illustrated in FIG. 3, wall portions W1, W2, and W3 are mounted to the first guide members 7. The wall portions W1, W2, and W3 are provided on both sides of the openings A1, A2, and A3 so as to partition the chambers R1, R2, and R3, respectively. The first guide members 7 each comprise a pair of guide surfaces 71 opposed to each other in the thickness direction of the glass sheet G3. A guide gap C1 is secured between the pair of guide surfaces 71. The interval of the guide gap C1 becomes smaller toward the downstream. That is, the guide gap C1 is large at an upstream end of the first guide member 7 and is small at a downstream end thereof. While the glass sheet G3 is conveyed by the second conveying apparatus 5, the lower end portion of the glass sheet G3 is caused to pass through the guide gap C1. With this, even in a state in which only the upper end portion of the glass sheet G3 is held, the lower end portion is properly guided. Thus, contact between the glass sheet G3 and the peripheral edge portions of the openings A1, A2, and A3 caused when the glass sheet G3 passes through the openings A1, A2, and A3 can be reduced. Further, even when the glass sheet G3 and the peripheral edge portions of the openings A1, A2, and A3 come into contact with each other, shock can be reduced. As a result, breakage of the glass sheet G3 can be prevented.

It is preferred that the guide surfaces 71 of the first guide member 7 be not brought into contact with the effective surface of the glass sheet G3. It is preferred that the guide surfaces 71 of the first guide member 7 guide the glass sheet G3, for example, in a range of 30 mm from the lower end of the glass sheet G3.

The guide surfaces 71 of the first guide member 7 are formed of, for example, resin such as engineering plastic, and, in order to prevent damage to the glass sheet G3, it is preferred that the guide surfaces 71 of the first guide member 7 be formed of, for example, a highly-slidable material such as high-molecular-weight polyethylene. The resin forming the guide surfaces 71 is replaceable.

It is preferred that an inclination angle θ1 of the guide surfaces 71 of the first guide member 7 with respect to the D direction be 10° to 40°. It is preferred that an opposing interval L1 of the pair of guide surfaces 71 at the downstream end be 300 mm to 400 mm. The glass sheet G3 may be curved due to warpage, and hence the opposing interval L1 is set larger than the thickness of the glass sheet G3 in consideration of the warpage. It is preferred that the opposing interval L1 be equal to or slightly smaller than an opening width B1 of the opening A1. The inclination angle θ1 and the opposing interval L1 can be adjusted as appropriate. Here, in this embodiment, opening widths of the openings A2 and A3 are equal to the opening width B1 of the opening A1, but may be set different from the opening width B1 of the opening A1. Further, the opposing intervals and the inclination angles of the first guide members 7 are equal to each other, but may be set different from each other. For example, the warpage of the glass sheet G3 tends to become smaller after the side edge portions G3b are removed. Therefore, the opposing interval of the first guide members 7 provided to the opening A3 located downstream of the removed positions of the side edge portions G3b (for example, the opposing interval at the downstream end) may be set smaller than the opposing intervals of the first guide members 7 provided to the other openings A1 and A2 located upstream of the removed positions of the side edge portions G3b (for example, the opposing intervals at the downstream end).

The second guide members 8 and the third guide members 9 have substantially the same configurations as the first guide members 7. That is, the second guide member 8 and the third guide member 9 also comprise a pair of guide surfaces 81 and 91, respectively. Guide gaps C2 and C3 are secured between the guide surfaces 81 and 91, respectively. Intervals of the guide gaps C2 and C3 become smaller toward the downstream side. When, while the glass sheet G3 is conveyed by the second conveying apparatus 5, the lower end portion of the glass sheet G3 is caused to pass through the guide gaps C2 and C3 to be guided, the scribe lines S2 can be precisely formed on the glass sheet G3 in the first chamber R1, and the glass sheet G3 can be precisely cleaved along the scribe lines S2 in the second chamber R2.

It is preferred that inclination angles θ2 and θ3 of the guide surfaces 81 and 91 of the second guide member 8 and the third guide member 9 be 10° to 40°. It is preferred that opposing intervals L2 and L3 of the guide surfaces 81 and 91 at the downstream end be 300 mm to 400 mm. The opposing intervals L2 and L3 may be equal to the opposing interval L1, but are set smaller than the opposing interval L1 in this embodiment.

Guide members may be provided similarly in the third chamber R3.

Next, a method of manufacturing glass sheet using the manufacturing apparatus for glass sheet configured as described above is described.

First, as illustrated in FIG. 1, the glass ribbon G2 is continuously formed by the forming apparatus 1 (forming step). Next, at a position below the forming apparatus 1, the glass ribbon G2 is cut in the width direction by the first cutting apparatus 2, and the glass sheet G3 is cut out from the glass ribbon G2 (first cutting step). After that, the glass sheet G3 in a vertical posture, which is cut out by the first conveying apparatus 3, is conveyed from the first position P1 to the second position P2 in the C direction (first direction) (first conveying step). At this time, as illustrated in FIG. 1 to FIG. 4, at the second position P2, the support portion 4 comes into contact with the lower end portion of the glass sheet G3, which is conveyed in the C direction, from the forward side in the conveying direction. After that, the glass sheet G3 in a vertical posture is conveyed from the second position P2 in the D direction (second direction) by the second conveying apparatus 5 (second conveying step). Then, while the glass sheet G3 is conveyed in the D direction by the second conveying apparatus 5, the boundary lines BL between the center portion G3a and the side edge portions G3b of the glass sheet G3 are cut in the up-and-down direction by the second cutting apparatus 6, and the side edge portions G3b are removed from the glass sheet G3 (second cutting step). In this embodiment, the center portion G3a thus cut out is conveyed to the subsequent step by the second conveying apparatus 5.

The method for manufacturing a glass sheet and manufacturing apparatus therefor according to the embodiment of the present invention are described above. However, the embodiment of the present invention is not limited thereto and can be variously modified within the range not departing from the spirit of the present invention.

Figure 5:
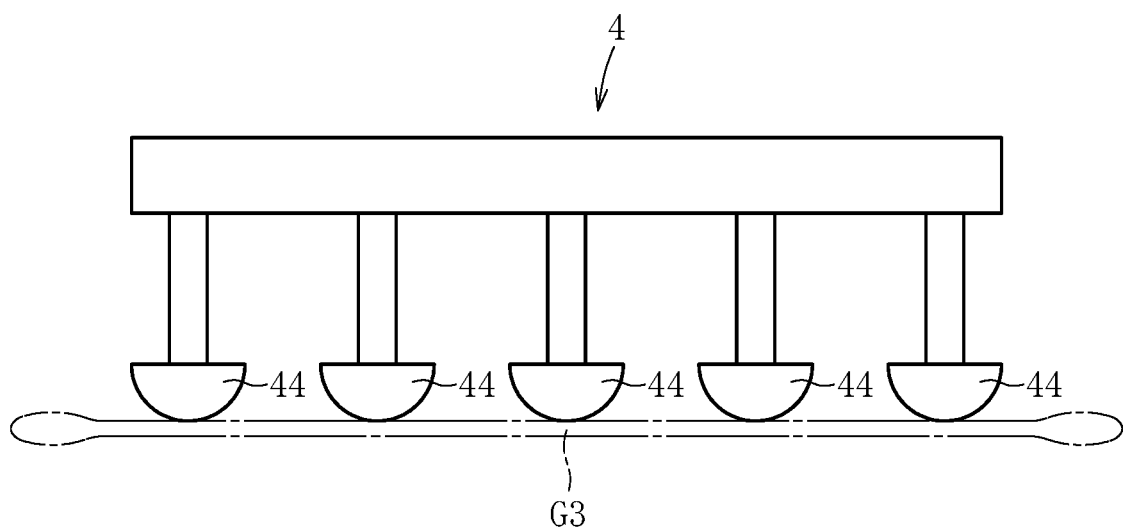
FIG. 5 is a plan view of a modification example of the support portion arranged at the second position.

In the embodiment described above, description is made of the case in which the support portion 4 comprises the rollers 41. However, the configuration of the support portion 4 is not limited thereto. For example, as illustrated in FIG. 5, the support portion 4 may have a pin shape not comprising a rotary mechanism. In this case, it is preferred that the contact portion of the support portion 4 comprise convex curved surface portions (including a semi-spherical shape) 44. It is preferred that the convex curved surface portions 44 be formed of resin such as engineering plastic, and, for example, can be formed of resin such as nylon.

In the embodiment described above, description is made of the case in which the glass ribbon G2 is formed by the overflow down-draw method. However, the glass ribbon G2 may be formed by other publicly-known forming methods such as a slot down-draw method, a re-draw method, or a float method.

In the embodiment described above, description is made of the case in which the glass ribbon G2 and the glass sheet G3 are scribed and cleaved. However, the glass ribbon G2 and/or the glass sheet G3 may be cut by other cutting methods such as laser cleaving or laser fusing.

In the embodiment described above, description is made of the case in which the side edge portions G3b of the glass sheet G3 to be conveyed each comprise a portion having a relatively large thickness. However, the glass sheet G3 to be conveyed may not comprise portions having a relatively large thickness at the side edge portions G3b, and may be have a substantially uniform thickness in the width direction.

In the embodiment described above, description is made of the case, while the glass sheet G3 is conveyed in the D direction by the second conveying apparatus 5, cutting and defect inspection are carried out in the chambers R1, R2, and R3 continuous with each other through the openings A1, A2, and A3. However, product-related processing carried out in the chambers is not particularly limited. For example, as the product-related processing, end-surface processing or cleaning for the glass sheet G3 may be carried out in the chambers. Further, the number of chambers can be adjusted as appropriated in accordance with the number of product-related processing to be carried out.

In the embodiment described above, description is made of the case in which, after the glass sheet G3 is conveyed in the C direction by the first conveying apparatus 3, the glass sheet G3 is delivered from the first conveying apparatus 3 to the second conveying apparatus 5 at the second position P2, and then, the glass sheet G3 is conveyed in the D direction by the second conveying apparatus 5. However, the configurations of the conveying apparatus are not particularly limited. For example, after the glass sheet G3 is delivered from the first conveying apparatus 3 to the second conveying apparatus 5 on the near side of the second position P2, the glass sheet G3 may be conveyed in the C direction to the second position P2 by the second conveying apparatus 5, and then, the glass sheet G3 may be conveyed in the D direction by the second conveying apparatus 5.

In the embodiment described above, description is made of the case in which the moving body 52 of the second conveying apparatus 5 moves from the second position P2 along the D direction to the third chamber R3 to convey the glass sheet G3 from the second position P2 along the D direction to the third chamber R3. However, the conveyance in the D direction is not particularly limited. For example, a plurality of conveying apparatus may be used, and the glass sheet G3 may be conveyed from the second position P2 along the D direction to the third chamber R3 while the glass sheet G3 is delivered to other conveying apparatus in the conveying path.

REFERENCE SIGNS LIST 1 forming apparatus
11 forming furnace
12 annealing furnace
13 cooling zone
14 roller pair
15 forming trough
2 first cutting apparatus
21 contact portion
22 holding portion
3 first conveying apparatus
31 holding portion
4 support portion
41 roller
42 arm portion
43 base portion
5 second conveying apparatus
51 holding portion
52 moving body
6 second cutting apparatus
61 contact portion
62 wheel cutter
63 contact portion
64 pressing portion
7 first guide member
8 second guide member
9 third guide member
A1, A2, A3 opening
C1, C2, C3 guide gap
G1 molten glass
G2 glass ribbon
G3 glass sheet
P1 first position
P2 second position (direction change position)
R1 first chamber
R2 second chamber
R3 third chamber
S1, S2 scribe line

The invention claimed is:

1. A method of manufacturing a glass sheet, the method comprising a conveying step of conveying a glass sheet by holding an upper part of the glass sheet in a vertical posture, the conveying step comprising:
  a first conveying step of conveying the glass sheet in a first direction along a direction perpendicular to a main surface of the glass sheet by a first conveying apparatus;
  a direction changing step of changing a conveying direction of the glass sheet from the first direction to a second direction, which is along a direction parallel to the main surface, at a direction changing position at a downstream end of a conveying path in the first direction; and
  a second conveying step of conveying the glass sheet in the second direction by a second conveying apparatus, wherein
  in the first conveying step, the glass sheet is supported by suspending the glass sheet by the first conveying apparatus, and
  in the direction changing step, a stopper is arranged at the direction changing position and the stopper is brought into contact with a lower part of the main surface of the glass sheet from a forward side in the conveying direction of the glass sheet conveyed in the first direction by the first conveying apparatus so as to prevent a lower part of the glass sheet from advancing toward the forward side in the conveying direction with respect to the upper part of the glass sheet.

2. The method of manufacturing a glass sheet according to claim 1, wherein a contact portion of the stopper to be brought into contact with the glass sheet comprises a roller that is rotatable so as to feed the glass sheet in the second direction.

3. The method of manufacturing a glass sheet according to claim 2, wherein the stopper comprises a shock absorbing mechanism.

4. The method of manufacturing a glass sheet according to claim 3,
  wherein the second conveying step comprises a step of moving the glass sheet, while conveying the glass sheet in the second direction, among a plurality of chambers continuous with each other through openings each having an elongated slit shape, and
  wherein guide members, each having a guide gap having an interval that becomes smaller toward downstream of the conveying direction, are arranged on near sides of the openings, respectively, and the lower part of the glass sheet is caused to pass through the guide gaps to be guided to the openings.

5. The method of manufacturing a glass sheet according to claim 4, wherein a thickness of a center portion of the glass sheet in a width direction of the glass sheet is 0.4 mm or less.

6. The method of manufacturing a glass sheet according to claim 3, wherein a thickness of a center portion of the glass sheet in a width direction of the glass sheet is 0.4 mm or less.

7. The method of manufacturing a glass sheet according to claim 2,
wherein the second conveying step comprises a step of moving the glass sheet, while conveying the glass sheet in the second direction, among a plurality of chambers continuous with each other through openings each having an elongated slit shape, and
wherein guide members, each having a guide gap having an interval that becomes smaller toward downstream of the conveying direction, are arranged on near sides of the openings, respectively, and the lower part of the glass sheet is caused to pass through the guide gaps to be guided to the openings.

8. The method of manufacturing a glass sheet according to claim 7, wherein a thickness of a center portion of the glass sheet in a width direction of the glass sheet is 0.4 mm or less.

9. The method of manufacturing a glass sheet according to claim 2, wherein a thickness of a center portion of the glass sheet in a width direction of the glass sheet is 0.4 mm or less.

10. The method of manufacturing a glass sheet according to claim 2, further comprising:
a forming step of continuously forming a glass ribbon in a vertical posture;
a first cutting step of cutting the glass ribbon of the vertical posture in a width direction of the glass ribbon to obtain the glass sheet in the vertical posture; and
a second cutting step of cutting the glass sheet of the vertical posture in an up-and-down direction of the glass sheet,
wherein the first conveying step is carried out after the first cutting step and before the second cutting step, and
wherein the second cutting step is carried out on a conveying path in the second conveying step.

11. The method of manufacturing a glass sheet according to claim 1, wherein the stopper comprises a shock absorbing mechanism.

12. The method of manufacturing a glass sheet according to claim 11,
wherein the second conveying step comprises a step of moving the glass sheet, while conveying the glass sheet in the second direction, among a plurality of chambers continuous with each other through openings each having an elongated slit shape, and
wherein guide members, each having a guide gap having an interval that becomes smaller toward downstream of the conveying direction, are arranged on near sides of the openings, respectively, and the lower part of the glass sheet is caused to pass through the guide gaps to be guided to the openings.

13. The method of manufacturing a glass sheet according to claim 12, wherein a thickness of a center portion of the glass sheet in a width direction of the glass sheet is 0.4 mm or less.

14. The method of manufacturing a glass sheet according to claim 11, wherein a thickness of a center portion of the glass sheet in a width direction of the glass sheet is 0.4 mm or less.

15. The method of manufacturing a glass sheet according to claim 11, further comprising:
a forming step of continuously forming a glass ribbon in a vertical posture;
a first cutting step of cutting the glass ribbon of the vertical posture in a width direction of the glass ribbon to obtain the glass sheet in the vertical posture; and
a second cutting step of cutting the glass sheet of the vertical posture in an up-and-down direction of the glass sheet,
wherein the first conveying step is carried out after the first cutting step and before the second cutting step, and
wherein the second cutting step is carried out on a conveying path in the second conveying step.

16. The method of manufacturing a glass sheet according to claim 1,
wherein the second conveying step comprises a step of moving the glass sheet, while conveying the glass sheet in the second direction, among a plurality of chambers continuous with each other through openings each having an elongated slit shape, and
wherein guide members, each having a guide gap having an interval that becomes smaller toward downstream of the conveying direction, are arranged on near sides of the openings, respectively, and the lower part of the glass sheet is caused to pass through the guide gaps to be guided to the openings.

17. The method of manufacturing a glass sheet according to claim 16, wherein a thickness of a center portion of the glass sheet in a width direction of the glass sheet is 0.4 mm or less.

18. The method of manufacturing a glass sheet according to claim 1, wherein a thickness of a center portion of the glass sheet in a width direction of the glass sheet is 0.4 mm or less.

19. The method of manufacturing a glass sheet according to claim 1, further comprising:
a forming step of continuously forming a glass ribbon in a vertical posture;
a first cutting step of cutting the glass ribbon of the vertical posture in a width direction of the glass ribbon to obtain the glass sheet in the vertical posture; and
a second cutting step of cutting the glass sheet of the vertical posture in an up-and-down direction of the glass sheet,
wherein the first conveying step is carried out after the first cutting step and before the second cutting step, and
wherein the second cutting step is carried out on a conveying path in the second conveying step.

* * * * *